United States Patent [19]

George et al.

[11] Patent Number: 5,369,210

[45] Date of Patent: Nov. 29, 1994

[54] HEAT-RESISTANT WATER-DISPERSIBLE SULFOPOLYESTER COMPOSITIONS

[75] Inventors: Scott E. George; Bobby J. Sublett, both of Kingsport, Tenn.

[73] Assignee: Eastman Chemical Company, Kingsport, Tenn.

[21] Appl. No.: 95,464

[22] Filed: Jul. 23, 1993

[51] Int. Cl.$^5$ .................................... C08G 63/688
[52] U.S. Cl. ................... 528/293; 528/272; 528/275; 528/286; 528/295; 528/298; 528/302; 528/307; 528/308; 528/308.6; 524/602; 524/603; 524/706; 524/711; 524/773; 524/777; 524/787
[58] Field of Search ............ 528/290, 295, 272, 275, 528/286, 293, 295, 298, 302, 307, 308, 308.6; 524/602, 603, 706, 711, 773, 777, 787

[56] References Cited

U.S. PATENT DOCUMENTS

| | | | |
|---|---|---|---|
| 3,018,272 | 1/1962 | Griffing et al. | 528/293 |
| 3,123,587 | 3/1964 | Hogsed et al. | 528/293 |
| 3,436,376 | 4/1969 | Duling et al. | 528/298 |
| 3,546,008 | 12/1970 | Shields et al. | 428/395 |
| 3,563,942 | 2/1971 | Helberger et al. | 524/602 |
| 3,734,874 | 5/1973 | Kibler et al. | 524/603 |
| 3,779,993 | 12/1973 | Kibler et al. | 528/288 |
| 4,480,085 | 10/1984 | Larson et al. | 528/295 |

Primary Examiner—Samuel A. Acquah
Attorney, Agent, or Firm—John D. Thallemer

[57] ABSTRACT

The present invention relates to sulfonate containing water-dispersible or water-dissipatible sulfopolyester compositions. The sulfopolyesters utilize at least two dicarboxylic acids, one of which is a naphthalene dicarboxylic acid. This combination of dicarboxylic acids allows for the sulfopolyesters to maintain glass transition temperatures (Tg) of greater than 89° C. and exhibit lower melt viscosities than sulfopolyesters containing all naphthalenediyl units or all isophthtaloyl units. The sulfopolyesters of this invention are useful in applications where improved heat and blocking resistance is required.

12 Claims, No Drawings

HEAT-RESISTANT WATER-DISPERSIBLE SULFOPOLYESTER COMPOSITIONS

FIELD OF THE INVENTION

The present invention relates to sulfonate containing water-dispersible or water-dissipatible sulfopolyester compositions. The sulfopolyesters utilize at least two dicarboxylic acids, one of which is a naphthalene dicarboxylic acid. This combination of dicarboxylic acids allows for the sulfopolyesters to maintain glass transition temperatures (Tg) of greater than 89° C. and exhibit lower melt viscosities than sulfopolyesters containing all naphthalenediyl units or all isophthaloyl units. The sulfopolyesters of this invention are useful in applications where improved heat and blocking resistance is required.

BACKGROUND OF THE INVENTION

Poly(ethylene-2,6-naphthalene dicarboxylate), referred to as PEN, has been used in films, fibers, and molded objects. U.S. Pat. Nos. 3,546,008, 3,563,942, 3,734,874, and 3,779,993 disclose water-dispersible copolyester and polyesteramide compositions containing metal sulfonate groups. None of the references, however, use Poly(ethylene-2,6-naphthalene dicarboxylate) or mention Tg. U.S. Pat. No. 4,480,085 discloses compositions containing 1,8-naphthalene dicarboxylic acid and sodiosulfoisophthalic acid as the dicarboxylic acid component in combination with ethylene glycol. The sulfopolyester had a Tg of 73° C. In contrast, the present inventors have determined that only certain naphthalenediyl isomers will yield polymers with Tg values above 89° C.

U.S. Pat. No. 3,436,376, discloses polyesters synthesized from 2,6-naphthalene dicarboxylic acid, and ethylene glycol. The polyesters have Tg's of approximately 125° C. Tg values of 88° C. and 73° C. were reported for the analogs where the ethylene glycol was replaced with 1,2-propane diol and 1,3-propane diol, respectively. The polyesters of U.S. Pat. No. 3,436,376 did not contain any sulfomonomer and were not water-dispersible or water-dissipatible.

U.S. Pat. No. 3,123,587, discloses compositions which are resistant to hydrolysis compared to 5-sulfoisophthalic acid modified poly(ethylene terephthalate) derived fibers. The compositions contain 1 to 5 mole % of 5-sulfoisophthalic acid with 75 mole % of the total acid component comprised of 2,6 or 2,7-naphthalenediyl units and 75 mole % of the total glycol component comprised of cyclohexanedimethanol. Improved hydrolytic stability was touted as an attribute of the invention. Thus, the polyesters are less likely to be water dispersible.

Copending commonly assigned U.S. Pat. Application Ser. No. 08/041,105 abandoned discloses water-dispersible sulfopolyesters having a Tg above 89° C. which contain a dicarboxylic acid component of poly(ethylene-2,6-naphthalene dicarboxylate) and a sulfomonomer, and a diol component containing at least 35 mole percent of selected diols. The sulfopolyesters of the copending application overcame the problems associated with prior patents which taught that increasing the glass transition temperature of the polyesters reduces the water-dispersibility of the polyesters. The copending application sulfopolyesters, however, posses high melt viscosities resulting in manufacturing problems.

Water-dispersible sulfopolyesters containing only isophthalate acid units or only terephthalic acid units tend to have Tg's less than 89° C. with aliphatic and alicyclic diols, while analogous systems containing only naphthalene dicarboxylic acid units tend to have a maximum Tg around 130° C., when common aliphatic and cycloaliphatic diols are used. Unexpectedly, the present inventors have determined that sulfopolyesters based on isophthalate or terephthalate units modified with naphthalene units not only maintain Tg's in the 89° C. to 130° C. range, but also exhibit melt viscosities lower than comparable systems containing only isophthalic acid or only naphthalene dicarboxylate units. It is desirable to have lower melt viscosities, since production process equipment is limited to a certain melt viscosity. Thus, lower melt viscosities will allow for higher molecular weights to be obtained for a given sulfopolyester.

SUMMARY OF THE INVENTION

Accordingly, it is one object of the present invention to provide water-dispersible high molecular weight sulfopolyester compositions.

Accordingly, it is another object of the invention to provide water-dispersible sulfopolyesters which have a Tg of greater than 89° C. and which exhibit lower melt viscosities.

Still another object of the invention is to provide water-dispersible sulfopolyester compositions which are useful in applications where increased abrasion resistance, inherent higher process temperature conditions, and improved blocking resistance are required.

These and other objects are accomplished herein by a water-dispersible sulfopolyester having a Tg of greater than 89° C. and low melt viscosity consisting essentially of repeat units from:

(a) 10 to 93 mole percent of a dicarboxylic acid selected from the group consisting of naphthalene-2,6-dicarboxylic acid, naphthalene-2,7-dicarboxylic acid, naphthalene-2,6-dicarboxylate ester and naphthalene-2,7-dicarboxylate ester;

(b) 2 to 85 mole percent of a dicarboxylic acid selected from the group consisting of aromatic dicarboxylic acids, saturated aliphatic dicarboxylic acids, cycloaliphatic dicarboxylic acids, and combinations thereof;

(c) a diol; and (d) a difunctional sulfomonomer containing at least one sulfonate group attached to an aromatic nucleus wherein the functional groups are hydroxy, carboxy or amino, provided the difunctional sulfomonomer is present in an amount from 5 to 40 mole percent based on 100 mole percent dicarboxylic acid and 100 mole percent diol.

DESCRIPTION OF THE INVENTION

This invention discloses compositions and methods of preparation for linear, water-dispersible sulfopolyesters having a Tg value of at least 89° C. and a low melt viscosity. The term "water-dispersible" is used interchangeably with other descriptors such as "water-dissipatible", "water-soluble" or "water-dispellable". All of these terms refer to the activity of water or a mixture of water with a water-miscible organic solvent on the sulfopolyesters described herein. This terminology includes conditions where the sulfopolyester is dissolved to form a true solution or is dispersed within an aqueous medium. Due to the statistical nature of polyester compositions, it is possible to have soluble and dispersible fractions when a single polyester is acted upon by an aqueous medium.

The sulfopolyester contains repeat units from at least two dicarboxylic acids, a diol, and a difunctional sulfomonomer. At least one of the dicarboxylic acids, component (a), is 10 to 93 mole percent based on 100 mole % dicarboxylic acid component, of naphthalene-2,6-dicarboxylic acid, naphthalene-2,7-dicarboxylic acid, naphthalene-2,6-dicarboxylate ester, or naphthalene-2,7-dicarboxylate ester. Preferably, the dimethyl ester forms are used.

In addition to the 2,6- or 2,7-naphthalene dicarboxylic acid or 2,6- or 2,7-dicarboxylic ester, the dicarboxylic acid component contains 2 to 85 mole percent of a dicarboxylic acid, component (b), which is selected from aliphatic, alicyclic, and aromatic dicarboxylic acids. Examples of these dicarboxylic acids include malonic, dimethylmalonic, succinic, dodecanedioic, glutaric, adipic, trimethyladipic, pimelic, 2,2-dimethylglutaric, azelaic, sebacic, fumaric, suberic, maleic, itaconic, 1,3-cyclopentane dicarboxylic, 1,2-cyclohexanedicarboxylic, 1,3-cyclohexanedicarboxylic, 1,4-cyclohexanedicarboxylic, phthalic, terephthalic, isophthalic, 2,5-norbornanedicarboxylic, diphenic, 4,4'-oxydibenzoic, diglycolic, thiodipropionic, 4,4'-sulfonyldibenzoic, 1,8-naphthalenedicarboxylic, and 2,5-naphthalenedicarboxylic. The anhydride, acid chloride, and ester derivatives of the above acids may also be used. The preferred dicarboxylic acid(s) to be used along with naphthalene dicarboxylic acid or naphthalene dicarboxylate ester are isophthalic acid, terephthalic acid, dimethyl terephthalate, and dimethyl isophthalate.

One aspect of this invention concerns the amount of 2,6- or 2,7-naphthalenediyl modification necessary for a given dicarboxylic acid or dicarboxylic acid combination to result in a polymer having a Tg above 89° C. In general, the amount of 2,6- or 2,7-naphthalenediyl modification will decrease in the order: aliphatic > cycloaliphatic > aromatic. Increasing the chain length of an aliphatic acid will result in a corresponding decrease in Tg, thus, requiring a higher level of naphthalenic modification.

The diol component, component (c), of the sulfopolyester consists of a diol selected from suitable aliphatic diols, cycloaliphatic diols, aromatic diols and combinations thereof. The aliphatic diols preferably have 2 to 20 carbon atoms, and the cycloaliphatic diols preferably have 6 to 20 carbon atoms. The diol component may also include mixtures of diols. Included within the class of aliphatic diols are aliphatic diols having ether linkages such as polydiols having 4 to 800 carbon atoms. Suitable diols include: ethylene glycol, diethylene glycol, triethylene glycol, 1,2-propanediol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,4-butanediol, 1,5-pentanediol, 1,6-hexanediol, 2,2,4-trimethyl-1,6-hexanediol, thioethanol, 1,2-cyclohexanedimethanol, 1,3-cyclohexanedimethanol, and 1,4-cyclohexanedimethanol. Preferably, the diol(s) are ethylene glycol, combinations of ethylene glycol with diethylene glycol, combinations of diethylene glycol with 1,4-cyclohexanedimethanol, combinations of ethylene glycol with 1,4-cyclohexanedimethanol, and combinations of ethylene glycol or diethylene glycol with a variety of suitable co-diols. The particular combination of diols is stipulated only by the requirements that the final product possess a Tg equal to or greater than 89° C. while maintaining water-dispersibility.

An aspect of the present invention concerns the effect of diol chain length on the Tg of the resulting product. The structures: $HO-CH_2-(CH2)_n-OH$ and $HO-(OCH_2-CH_2)_x-OH$ refer to the homologous series' of diols that are composed of methylene and oxyethylene subunits. Values of n for $HO-CH_2-(CH_2)_n-OH$ are normally in the range from 1 to 12. As n increases the Tg for a resulting homopolyester resin is decreased accordingly. Therefore, modification of essentially a sulfonate-containing poly(ethylene naphthalene dicarboxylate) requires proportionately smaller molar amounts of co-diol as n increases. A similar trend is observed when n increases from one (diethylene glycol) to about for oxyethylene glycols.

In the case of $HO-(OCH_2-CH_2)_x-OH$, referred to as poly(ethylene glycol) or PEG, the value of x will be 10 to 5.0, preferably about 20, which translates into a PEG monomer molecular weight of at least 500, preferably about 1000. Typically less than 5 mole percent of PEG incorporation, based on total diol, will be used since a Tg of greater than 89° C. is required. One advantage of high molecular weight PEG modification is the ability to attain higher molecular weights without losing water-dispersibility. It is important to note that high sulfomonomer levels result in high process melt viscosities which limit the molecular weight attainable in the melt phase. A low molecular weight determined by an inherent viscosity measurement of less than 0.1 dl/g may result in poor physical-properties such as low Tg and inadequate tensile strength.

The difunctional sulfomonomer, component (d), of the sulfopolyester may be a dicarboxylic acid or an ester thereof containing a metal sulfonate group ($-SO_3^-$), a diol containing a metal sulfonate group, or a hydroxy acid containing a metal sulfonate group. Suitable metal cations of the sulfonate salt may be $Na^+$, $Li^+$, $K^+$, $Mg^{++}$, $Ca^{++}$, $Ni^{++}$, $Fe^{++}$, $Fe^{+++}$, $Zn^{++}$ and substituted ammonium. The term "substituted ammonium" refers to ammonium substituted with an alkyl or hydroxy alkyl radical having 1 to 4 carbon atoms. It is within the scope of this invention that the sulfonate salt is non-metallic and can be a nitrogenous base as described in U.S. Pat. No. 4,304,901 which is incorporated herein by reference.

The choice of cation will influence the water-dispersibility of the resulting polyester. Monovalent alkali metal ions yield polyesters that are less readily dissipated by cold water and more readily dissipated by hot water, while divalent and trivalent metal ions result in polyesters that are not ordinarily easily dissipated by cold water but are more readily dispersed in hot water. Depending on the end use of the polymer, either of the different sets of properties may be desirable. It is possible to prepare the sulfopolyester using, for example, a sodium sulfonate salt and later by ion-exchange replace this ion with a different ion, for example, calcium, and thus alter the characteristics of the polymer. In general, this procedure is superior to preparing the polymer with divalent salts inasmuch as the sodium salts are usually more soluble in the polymer manufacturing components than are the divalent metal salts. Polymers containing divalent and trivalent metal ions are normally less elastic and rubber-like than polymers containing monovalent ions.

The difunctional sulfomonomer contains at least one sulfonate group attached to an aromatic nucleus wherein the functional groups are hydroxy, carboxy or amino. Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Examples of sulfomonomers include sulfophthalic acid, sulfoterephthalic acid, sulfoisophthalic acid, 5-sodiosulfoisophthalic acid, 4-sulfonaphthalene-2,7-dicarboxylic acid, and their esters. Metallosulfoaryl sulfonate which is described in U.S. Pat. No. 3,779,993, and is incorporated herein by reference, may also be used as a sulfomonomer.

The sulfomonomer is present in an amount to provide water-dispersibility to the sulfopolyester. It is possible to adjust the water-dispersibility of the sulfopolyester by varying the mole percentage of sulfomonomer. Preferably, the sulfomonomer is present in an amount of from 5 to 40 mole percent, more preferably 8 to 30 mole percent, and most preferably 15 to 25 mole percent, based on the sum of the moles of total dicarboxylic acid content.

Semi-crystalline and amorphous materials are within the scope of the present invention. It is to be understood that the sulfopolyesters of this invention contain substantially equal molar proportions of acid equivalents (100 mole %) to hydroxy equivalents (100 mole %). Thus, the sulfopolyester comprised of components (a), (b), (c), and (d) will have a total of acid and hydroxyl equivalents equal to 200 mole percent. The sulfopolyesters have an inherent viscosity of 0.1 to 1.0 dl/g, preferably 0.2 to 0.6 dl/g.

A buffer is preferably added to the compositions of the present invention. Buffers and their use are well known in the art and do not require extensive discussions. Preferred buffers include sodium acetate, potassium acetate, lithium acetate, sodiumphosphate monobasic, potassium phosphate dibasic and sodium carbonate. The buffer is present in an amount of up to 0.2 moles per mole of difunctional sulfomonomer. Preferably, the buffer is present in an amount of about 0.1 moles per mole of difunctional sulfomonomer.

The sulfopolyesters can be prepared by conventional polycondensation procedures well-known in the art. Such processes include direct condensation of the dicarboxylic acids with the diol(s) or by ester interchange using lower alkyl esters. For example, a typical procedure consists of two stages. The first stage, known as ester-interchange or esterification, is conducted in an inert atmosphere at a temperature of 175° C. to 240° C. for 0.5 to 8 hours, preferably 1 to 4 hours. The diols, depending on their particular reactivities and the specific experimental conditions employed, are commonly used in molar excesses of 1.05 to 2.5 per mole of total dicarboxylic acid.

The second stage, referred to as polycondensation, is conducted under reduced pressure at a temperature of 230° C. to 350° C., preferably 265° C. to 325° C., and more preferably 270° C. to 290° C. for 0.1 to 6 hours, preferably 0.25 to 2 hours. Because high melt viscosities are encountered in the polycondensation stage, it is sometimes advantageous to employ temperatures above 300° C. since the resulting decrease in melt viscosity allows somewhat higher molecular weights to be obtained. Stirring or appropriate conditions are employed in both stages to ensure sufficient heat transfer and surface renewal for the reaction mixture. The reactions of both stages are facilitated by appropriate catalysts which are well known in the art. Suitable catalysts include, but are not limited to, alkoxy titanium compounds, alkali metal hydroxides and alcoholates, salts of organic carboxylic acids, alkyl tin compounds and metal oxides.

The sulfopolyesters of this invention are useful as adhesives, coating materials, sizes, laminated products, aqueous printing inks, and films. Particular utility is found in applications where increased abrasion resistance, inherent higher temperature process conditions, and improved blocking resistance are required.

The materials and testing procedures used for the results shown herein are as follows:

CARBOWAX 600 is a trademark for a polyethylene glycol having a number average molecular weight (Mn) of 600 daltons.

Glass transition temperature (Tg) was determined using a differential scanning calorimeter (DSC).

Inherent viscosity (I.V.) was measured at 23° C. using 0.50 grams of polymer per 100 ml of a solvent consisting of 60% by weight phenol and 40% by weight tetrachloroethane.

The process of the present invention will be further illustrated by a consideration of the following examples, which are intended to be exemplary of the invention. All parts and percentages in the examples are on a weight basis unless otherwise stated.

EXAMPLE 1

Isophthalate-Based Sulfopolyester containing 19 mole % 5-sodiosulfoisophthalate.

A 500 mL flask was equipped with a head having a nitrogen inlet, a sidearm to allow removal of volatile materials, and a socket joint to accommodate a stirrer. The stirrer shaft was inserted through the socket joint and has a ball joint attached by pressure tubing to the shaft, which provides a vacuum seal. The flask is charged with 29.1 grams (0.15 moles) dimethylisophthalate, 61.0 grams (0.25 moles) dimethyl-2,6-naphthalene dicarboxylate, 29.6 grams (0.1 moles) dimethyl-5-sodiosulfoisophthalate, 66.2 grams (0.46 moles) 1,4-cyclohexanedimethanol, 9.3 grams (0.15 moles) ethylene glycol, 0.82 grams (0.01 moles) sodium acetate, and 0.45 mL of a 1.46% (w/w) solution of titanium(IV) isopropoxide in n-butanol. After the reactants were purged with nitrogen the flask was immersed in a Belmont metal bath preheated to 200° C. for two hours with stirring under a gentle sweep of inert gas. The temperature of the bath was raised to 215° C. and the reaction allowed to continue for an additional two hours to complete the transesterification stage. The bath temperature was increased from 215° C. to 280° C. and the nitrogen purge was replaced with a vacuum of < 0.5 mm Hg. The flask was heated for about 10 minutes under the reduced pressure before the viscosity of the molten material exceeded the capacity of the stirrer to provide adequate surface renewal. At this time the flask was removed from the metal bath and the vacuum was assuaged with a nitrogen sparge.

After the polymer had cooled to room temperature it was removed from the flask. Analysis of the polymer indicated that the diol component consisted of approximately 85 mole % 1,4-cyclohexanedimethanol and approximately 15 mole % diethylene glycol. The test results are summarized in Table I.

EXAMPLE 2

Terephthalate-Based Water-Dispersible Polyester Containing 20 Mole % 5-Sodiosulfoisophthalate The apparatus and procedure used is described in Example 1. The amounts of reactants were initially charged to the flask: 29.1 grams (0.15 moles) dimethylterephthalate, 61.0 grams (0.25 moles) dimethyl-2,6-naphthalenedicarboxylate, 29.6 grams (0.1 moles) dimethyl-5-sodiosulfoisophthalate, 66.2 grams (0.46 moles) 1,4-cyclohexanedimethanol, 9.3 grams (0.15 moles) ethylene glycol, 3.0 grams (0.005 moles) CARBOWAX 600, 0.52 grams (0.01 moles) sodium acetate, and 0.46 mL of a 1.46% (w/w) solution of titanium(IV) isopropoxide in n-butanol. The transesterification stage was conducted at 200° C. for two hours and 215° C. for two hours with the continuous removal of methanol by distillation. The second stage, also known as the polymerization stage, was performed at a reduced pressure between 0.05 to 0.5 mm Hg at a temperature of 280° C. for ten minutes.

Analysis of the polymer indicated that the diol component consisted of approximately 88 mole % 1,4-cyclohexanedimethanol, approximately 11 mole % diethylene glycol, and 1 mole % CARBOWAX 600. The test results are summarized in Table I.

EXAMPLE 3

(Comparative) No Naphthalene Modification

The apparatus and procedure used is described in Example 1. A polyester was prepared with 81 mole % isophthalic acid, 19 mole % 5-sodiosulfoisophthalate and a diol mix of 86 mole % 1,4-cyclohexanedimethanol, 12 mole % ethylene glycol, and 2 mole % diethylene glycol. The test results are summarized in Table I.

EXAMPLE 4

Efficacy of Naphthalene Modification

The apparatus and procedure used is described in Example 1. A polyester was prepared with 29 mole % isophthalic acid, 52 mole % dimethyl-2,6-naphthalenedicarboxylate, 19 mole % 5-sodiosulfoisophthalate and a diol mix of 87 mole % 1,4-cyclohexanedimethanol, 10 mole % ethylene glycol, and 3 mole % diethylene glycol. The test results are summarized in Table I.

EXAMPLE 5

Relationship of Aliphatic Acid Modification to Tg.

The apparatus and procedure used is described in Example 1. A polyester was prepared with 5 mole % sebacic acid, 77 mole % dimethyl-2,6-naphthalenedicarboxylate, 18 mole % 5-sodiosulfoisophthalate and a diol mix of 94 mole % ethylene glycol and 6 mole % diethylene glycol. The test results are summarized in Table I.

EXAMPLE 6

Relationship of Aliphatic Acid Modification to Tg.

The apparatus and procedure used is described in Example 1. A polyester was prepared with 13 mole % sebacic acid, 69 mole % dimethyl-2,6-naphthalenedicarboxylate, 18 mole % 5-sodiosulfoisophthalate and a diol mix of 95 mole % ethylene glycol and 5 mole % diethylene glycol. The test results are summarized in Table I.

EXAMPLE 7

Relationship of Aliphatic Acid Modification to Tg.

The apparatus and procedure used is described in Example 1. A polyester was prepared with 2 mole % succinic acid, 79 mole % dimethyl-2,6-naphthalenedicarboxylate, 19 mole % 5-sodiosulfoisophthalate and a diol component of ethylene glycol. The test results are summarized in Table I.

EXAMPLE 8

Relationship of Aliphatic Acid Modification to Tg.

The apparatus and procedure used is described in Example 1. A polyester was prepared with 10 mole % succinic acid, 71 mole % dimethyl-2,6-naphthalenedicarboxylate, 19 mole % 5-sodiosulfoisophthalate and a diol component of ethylene glycol. The test results are summarized in Table I.

Examples 5 to 8 illustrate how the molar amount of incorporation and chain length of an aliphatic acid lowers the Tg of a polymer based on naphthalene units.

EXAMPLES 9–10

Effect of PEG Incorporation on IV and Tg

The apparatus and procedure used is described in Example 1. Two polyesters containing approximately 21 mole % 5-sodiosulfoisophthalate and approximately 80 mole % 1,4-cyclohexanedimethanol are modified with 0.3 and 1.7 mole % of a polyethylene glycol having a molecular weight of 1000 daltons, respectively. The inherent viscosity increased from 0.28 to 0.31 with a concomitant decrease in Tg from 110° to 105° C. The test results are summarized in Table I.

EXAMPLES 11–12

Effect of SIP Level on Tg

The apparatus and procedure used is described in Example 1. Two polyesters differing only in amount of SIP level are determined to have Tg's of 98° and 100° C. for SIP levels of 15 and 20 mole %, respectively. The amounts and test results are summarized in Table I.

EXAMPLES 13–14

Importance of Diol Component Identity to Tg

The apparatus and procedure used is described in Example 1. Two polyesters containing different diol ratios of DEG/EG are compared which shows the critical nature of the diol component to Tg. The ratios and test results are summarized in Table I.

EXAMPLES 15–17

Relationship of Aliphatic Glycol Modification to Tg

The apparatus and procedure used is described in Example 1. Examples 15–17 illustrate that both the molar amount of incorporation and chain length of an aliphatic glycol affects the Tg of a particular composition. The amount, chain length of the glycols and test results are summarized in Table I.

TABLE I

| Example | Dicarboxylic Acid (Mole %) | Diol (Mole %) | SIP (Mole %) | IV | Water Dispersibility at 80° C. (wt %) | Tg (°C.) |
|---|---|---|---|---|---|---|
| 1 | N (51) I (30) | CHDM (85) EG (15) | 19 | 0.30 | 15 | 109 |
| 2 | N (46) | CHDM (88) | 22 | 0.31 | 15 | 117 |

TABLE I-continued

| Example | Dicarboxylic Acid (Mole %) | Diol (Mole %) | SIP (Mole %) | IV | Water Dispersibility at 80° C. (wt %) | Tg (°C.) |
|---|---|---|---|---|---|---|
| | T (32) | EG (11) PEG600 | | | | |
| 3 (Control) | I (81) | CHDM (86) EG (12) DEG (2) | 19 | 0.23 | 30 | 87 |
| 4 | N (52) I (29) | CHDM (87) EG (10) DEG (3) | 19 | 0.23 | 20 | 97 |
| 5 | N (77) SB (5) | EG (94) DEG (6) | 18 | 0.18 | 30 | 114 |
| 6 | N (69) SB (13) | EG (95) DEG (5) | 18 | 0.20 | 30 | 86 |
| 7 | N (79) SC (2) | EG (100) | 19 | 0.20 | 30 | 119 |
| 8 | N (71) SC (10) | EG (100) | 19 | 0.20 | 30 | 109 |
| 9 | N (52) I (27) | CHDM (77) EG (23) PEG1000 (.3) | 21 | 0.28 | 15 | 110 |
| 10 | N (52) I (28) | CHDM (80) EG (18) PEG1000 (2) | 20 | 0.31 | 15 | 105 |
| 11 | T (73) N (12) | EG (96) DEG (4) | 15 | 0.22 | 30 | 98 |
| 12 | T (69) N (11) | EG (95) DEG (5) | 20 | 0.18 | 30 | 100 |
| 13 | I (37) N (22) | EG (95) DEG (5) | 21 | 0.21 | 30 | 90 |
| 14 | I (38) N (22) | EG (40) DEG (60) | 20 | 0.24 | 30 | 60 |
| 15 | N (53) T (27) | EG (74) BD (26) | 20 | 0.14 | 30 | 90 |
| 16 | N (50) T (29) | EG (66) BD (34) | 21 | 0.13 | 30 | 79 |
| 17 | N (50) T (30) | EG (60) HD (40) | 20 | 0.21 | 30 | 71 |

KEY TO ABBREVIATIONS
BD = 1,4-butanediol
CHDM = 1,4-cyclohexanedimethanol
DEG = diethylene glycol
EG = ethylene glycol
HD = 1,6-hexanediol
I = isophthalic acid or dimethyl isophthalate
N = dimethyl-2,6-naphthalene dicarboxylate
PEG600 = poly(ethylene glycol)
PEG1000 = polyethylene glycol
SB = sebacic acid
SC = succinic acid
SIP = 5-sodiosulfoisophthalate
T = terephthalic acid or dimethyl terephthalate In Examples 18–27, a parallel plate mechanical spectrometer was used to determine the melt viscosities at 275° C. over a range of frequencies. An Instron capillary rheometer was used to obtain melt viscosity data for Examples 27 and 28 at 275° C. over a range of shear rates.

EXAMPLES 18 and 19

Examples 18 and 19 indicate that incorporation of napthalenediyl units raises the Tg of an all isophthalate composition, but results in a lower melt viscosity even though the level of SIP is higher for the modified system. The compositional and characterization data for the polyesters used in the melt viscosity determinations are provided in Table II.

EXAMPLES 20 and 21

Examples 20 and 21 indicate that a isophthalate/naphthalate system may have a significantly higher molecular weight and lower melt viscosity than an all-naphthalate composition without significantly lowering the Tg. The compositional and characterization data for the polyesters used in the melt viscosity determinations are provided in Table II.

EXAMPLES 22 and 23

Examples 22 and 23 indicate that even small amounts of incorporated aliphatic acids yield a composition with a high Tg and reduced melt viscosity. The compositional and characterization data for the polyesters used in the melt viscosity determinations are provided in Table II.

EXAMPLES 24 and 25

Examples 24 and 25 indicate that the modified systems have lower melt viscosities at much higher molecular weights. In addition, the all-naphthalene composition contains predominately EG while the modified composition is mainly CHDM; normally CHDM results in a higher melt viscosity than EG. The compositional and characterization data for the polyesters used in the melt viscosity determinations are provided in Table II.

EXAMPLES 26 and 27

Examples 26 and 27 are comparative examples which indicate that increasing the cycloaliphatic diol (i.e., CHDM) content, while decreasing the glycol ether (i.e., DEG) content, results in a higher melt viscosity. The compositional and characterization data for the polyesters used in the melt viscosity determinations are provided in Table II.

TABLE II

| Example | Dicarboxylic Acid (Mole %) | Diol (Mole %) | SIP (Mole %) | IV | Tg (°C.) |
|---|---|---|---|---|---|
| 18 | I (81) | CHDM (86) EG (12) DEG (2) | 19 | 0.23 | 86 |
| 19 | I (64) N (14) | CHDM (85) EG (12) DEG (3) | 22 | 0.23 | 93 |
| 20 | N (51) I (29) | CHDM (76) DEG (24) | 20 | 0.33 | 105 |
| 21 | N (80) | CHDM (76) DEG (24) | 20 | 0.26 | 110 |
| 22 | N (79) SC (2) | EG (98) DEG (2) | 19 | 0.20 | 119 |
| 23 | N (82) | EG (93) DEG (6) PEG 1000 (1) | 18 | 0.21 | 115 |
| 24 | T (60) N (25) | CHDM (81) EG (17) DEG (2) | 15 | 0.34 | 112 |
| 25 | N (85) | EG (72) CHDM (21) DEG (7) | 15 | 0.29 | 129 |
| 26 | I (81) | CHDM (83) DEG (17) | 19 | 0.32 | 84 |
| 27 | I (82) | DEG (54) CHDM (46) | 18 | 0.34 | 54 |

TORQUE DATA (Temperature = 275 +/− 1° C.)

| Viscosity (Poise) | Frequency (rad/s) |
|---|---|
| EXAMPLE 18 (Control): | |
| 7081 | 1.0 |
| 7024 | 1.6 |
| 6970 | 2.5 |
| 6908 | 4 |
| 6846 | 6 |
| 6755 | 10 |
| 6635 | 16 |
| 6480 | 25 |
| 6278 | 40 |
| 6014 | 63 |
| 5665 | 100 |
| 5247 | 159 |
| 4771 | 251 |
| 4281 | 398 |
| EXAMPLE 19: | |
| 5534 | 1.0 |
| 5511 | 1.6 |
| 5455 | 2.5 |
| 5436 | 4 |
| 5406 | 6 |
| 5372 | 10 |
| 5323 | 16 |
| 5254 | 25 |
| 5162 | 40 |
| 5028 | 63 |
| 4834 | 100 |
| 4573 | 159 |
| 4254 | 251 |
| 3908 | 398 |
| EXAMPLE 20: | |
| 9300 | 1.0 |
| 9236 | 1.6 |
| 9140 | 2.5 |
| 9109 | 4 |
| 9017 | 6 |
| 8892 | 10 |
| 8705 | 16 |
| 8474 | 25 |
| 8175 | 40 |
| 7790 | 63 |
| 7293 | 100 |
| 6702 | 159 |
| 6057 | 251 |
| 5410 | 398 |
| EXAMPLE 21 (Control): | |
| 30094 | 1.0 |
| 26400 | 1.6 |
| 23020 | 2.5 |
| 20390 | 4 |
| 18240 | 6 |
| 16460 | 10 |
| 14960 | 16 |
| 13660 | 25 |
| 12500 | 40 |
| 11420 | 63 |
| 10310 | 100 |
| 9238 | 159 |
| 8205 | 251 |
| 7286 | 398 |
| EXAMPLE 22: | |
| 4170 | 1.0 |
| 4057 | 1.6 |
| 3919 | 2.5 |
| 3752 | 4 |
| 3608 | 6 |
| 3474 | 10 |
| 3349 | 16 |
| 3233 | 25 |
| 3124 | 40 |
| 3018 | 63 |
| 2903 | 100 |
| 2768 | 159 |
| 2611 | 251 |
| 2430 | 398 |
| EXAMPLE 23 (Control): | |
| 7730 | 1.0 |
| 7706 | 1.6 |
| 7668 | 2.5 |
| 7612 | 4 |
| 7532 | 6 |
| 7437 | 10 |
| 7298 | 16 |
| 7114 | 25 |
| 6872 | 40 |
| 6550 | 63 |
| 6140 | 100 |
| 5654 | 159 |
| 5118 | 251 |
| 4575 | 398 |
| EXAMPLE 24: | |
| 40670 | 1.0 |
| 39650 | 1.6 |
| 38390 | 2.5 |
| 36900 | 4 |
| 35220 | 6 |
| 33260 | 10 |
| 30950 | 16 |
| 28310 | 25 |
| 25370 | 40 |
| 22280 | 63 |
| 19150 | 100 |
| 16150 | 159 |
| 13440 | 251 |
| 11170 | 398 |
| EXAMPLE 25 (Control): | |
| 57420 | 1.0 |
| 56340 | 1.6 |
| 54850 | 2.5 |
| 52860 | 4 |
| 50260 | 6 |
| 46920 | 10 |
| 42920 | 16 |
| 38430 | 25 |

-continued

TORQUE DATA (Temperature = 275 +/− 1° C.)

| | |
|---|---|
| 33700 | 40 |
| 28910 | 63 |
| 24270 | 100 |
| 20010 | 159 |
| 16320 | 251 |
| 13350 | 398 |

| Viscosity (poise) | Shear Rate (1/s) |
|---|---|
| EXAMPLE 26: | |
| 6500 | 4.5 |
| 6200 | 15 |
| 6150 | 45 |
| 4800 | 150 |
| 4200 | 450 |
| 2700 | 1500 |
| EXAMPLE 27: | |
| 2100 | 4.5 |
| 2200 | 15 |
| 2150 | 45 |
| 1700 | 150 |
| 1500 | 450 |
| 1200 | 1500 |

The results from Examples 18 to 28 indicate that the melt viscosity of high Tg water-dispersible polyesters based on naphthalenediyl modification have lower melt viscosities than compositions having only napthalenediyl units. The compositions modified with naphthalenediyl units also have lower melt viscosities than the higher Tg water-dispersible polyesters comprised of isophthaloyl units. Thus, compositions containing isophthalate and naphthalenediylic units retain a high Tg, however, particular compositions having a given Tg will have lower melt viscosities than compositions possessing only naphthalenediyl units at the same given Tg. In addition, compositions based on only isophthaloyl units having Tg values in the 80° C. to 89° C. range also have higher melt viscosities than the compositions containing both isophthalate and naphthalenediyl units. Many variations will suggest themselves to those skilled in this art in light of the above detailed description. All such obvious modifications are within the full intended scope of the appended claims.

What is claimed is:

1. A water-dispersible sulfopolyester having a glass transition temperature of greater than 89° C. and low melt viscosity consisting essentially of repeat units from:
   (a) 10 to 93 mole percent of a dicarboxylic acid selected from the group consisting of naphthalene-2,6-dicarboxylic acid, naphthalene-2,7-dicarboxylic acid, naphthalene-2,6-dicarboxylate ester and naphthalene-2,7-dicarboxylate ester;
   (b) 2 to 85 mole percent of a dicarboxylic acid selected from the group consisting of isophthalic acid, terephthalic acid, dimethyl terephthalate, and dimethyl isophthalate. and combinations thereof;
   (c) a diol wherein 0.1 to 5 mole percent of the diol is a polymeric diol having the formula HO—(OCH$_2$—CH$_2$)$_x$—OH, wherein x is 10 to 50; and
   (d) a difunctional sulfomonomer containing at least one sulfonate group attached to an aromatic nucleus wherein the functional groups are hydroxy, carboxy or amino, provided the difunctional sulfomonomer is present in an amount from 15 to 25 mole percent based on 100 mole percent dicarboxylic acid and 100 mole percent diol.

2. The sulfopolyester of claim 1 wherein the sulfopolyester is prepared using a buffer in an amount of 0.001 to 0.2 moles per mole of difunctional sulfomonomer.

3. The sulfopolyester of claim 2 wherein the buffer is present in an amount of 0.1 moles per mole of difunctional sulfomonomer.

4. The sulfopolyester of claim 2 wherein the buffer is selected from the group consisting of sodium acetate, potassium acetate, lithium acetate, sodium phosphate monobasic, potassium phosphate dibasic and sodium carbonate.

5. The sulfopolyester of claim 4 wherein the buffer is sodium acetate.

6. The sulfopolyester of claim 1 wherein the diol component is a mixture of ethylene glycol and diethylene glycol.

7. The sulfopolyester of claim 1 wherein the diol component is a mixture of diethylene glycol and 1,4-cyclohexanedimethanol.

8. The sulfopolyester of claim 1 wherein the diol component is a mixture of ethylene glycol and polyethylene glycol.

9. The sulfopolyester of claim 8 wherein the polyethylene glycol is present in an amount of 1 to 4 mole percent.

10. The sulfopolyester of claim 1 wherein the diol component is a mixture of diethylene glycol and polyethylene glycol.

11. The sulfopolyester of claim 1 wherein the difunctional sulfomonomer component is selected from the group consisting of sulfophthalic acid, sulfoterephthalic acid, sulfoisophthalic acid, 4-sulfonaphthalene-2,7-dicarboxylic acid, and esters thereof.

12. The sulfopolyester of claim 10 wherein the difunctional sulfomonomer component is 5-sodiosulfoisophthalic acid.

* * * * *